United States Patent [19]

Hammer

[11] Patent Number: 5,720,234
[45] Date of Patent: Feb. 24, 1998

[54] AIR BAG

[75] Inventor: Barbel Hammer, Mainz, Germany

[73] Assignee: AlliedSignal Deutschland GmbH, Raunheim, Germany

[21] Appl. No.: 644,386

[22] Filed: May 10, 1996

[30] Foreign Application Priority Data

May 12, 1995 [DE] Germany .................. 95 09 622.8

[51] Int. Cl.⁶ .......................... D05B 13/00; B60R 21/16
[52] U.S. Cl. ................... 112/475.08; 280/743.1
[58] Field of Search ............... 112/475.08, 10, 112/63, 2; 280/728.1, 743.1

[56] References Cited

U.S. PATENT DOCUMENTS

| | | | |
|---|---|---|---|
| 3,970,328 | 7/1976 | Wallsten | 280/743.1 X |
| 4,006,918 | 2/1977 | MacFarland | 280/743.1 X |
| 4,988,118 | 1/1991 | Good et al. | |
| 4,989,525 | 2/1991 | Portilla | 112/10 |
| 5,310,216 | 5/1994 | Wehner et al. | |
| 5,316,337 | 5/1994 | Yamaji et al. | 280/728.1 X |
| 5,482,317 | 1/1996 | Nelsen et al. | 280/728.1 X |
| 5,520,414 | 5/1996 | Bishop | 280/728.1 X |

FOREIGN PATENT DOCUMENTS

| | | |
|---|---|---|
| 4311569 | 7/1994 | Germany. |
| 71125593 | 5/1995 | Japan. |
| 1460965 | 1/1977 | United Kingdom. |
| 1476812 | 6/1977 | United Kingdom. |
| 1484424 | 9/1977 | United Kingdom. |
| WO95/00366 | 1/1995 | WIPO. |

*Primary Examiner*—Peter Nerbun
*Attorney, Agent, or Firm*—Markell Seitzman

[57] ABSTRACT

The present invention provides a method of making an air bag comprising joining pieces of fabric together by stitching in substantially straight lines so as to facilitate automated machine stitching of the pieces. Preferable a generally rectangular piece is stitched to four triangular pieces. Preferably there are two large triangular and two small triangular pieces and each are irregular triangles with three different sides though the large and small triangular pieces may have one side the same length as another side. The total sum of the lengths of the other four sides should equal the length of the long side of the rectangle. Such pieces are joined by attaching the long sides of the triangular pieces to end regions of the long sides of the rectangular piece, folding the resultant shape, joining respective adjoining second sides of the triangular pieces, displacing the apexes of the joined pieces so that the third sides of the respective triangles form a straight line with the long sides of the rectangle, and joining the third sides of the respective triangles to unjoined parts of the long sides of the rectangle.

16 Claims, 3 Drawing Sheets

AIR BAG

FIELD OF THE INVENTION

The present invention relates to inflatable cushions for vehicle occupant protection in the event of a crash, such cushions being commonly known as air bags, and specifically to a method of making an air bag.

BACKGROUND ART

Traditionally air bags are made by sewing panels of a suitable material together to produce a hollow structure shaped and adapted to provide maximum protection for the vehicle occupant in the event of a crash. On the driver's side this is usually a generally circular structure of similar shape to the steering wheel and somewhat larger than it when inflated so as to provide a cushion barrier between the driver's head and the steering wheel. On the passenger side a larger air bag is needed since the space to be filled by the bag on inflation being that between the passenger's head and upper body and the passenger side dashboard where the uninflated air bag is stored is much larger on the passenger side. Usually a passenger air bag is made by joining a generally rectangular piece of fabric, by stitching together the short sides of the rectangle and subsequently sewing circular, near circular or oval pieces into the open ends formed by the long sides.

However cutting circular pieces out of a length of fabric is wasteful of the raw material. Air bag material is expensive since it has to be woven to extremely exacting standards: it must be light, have high strength to resist inflation and crash impact pressures and have a very particular porosity to be effective in inflating quickly yet subsequently deflating within a defined time period. Hence wasted material adds significantly to the cost per item.

In addition, circular seams cannot easily be sewn by machine. The need for hand sewing also makes air bags expensive. It is an object of the present invention to provide a method of making an air bag in which a higher proportion of raw material is used and for which automated sewing machinery can be used.

DISCLOSURE OF THE INVENTION

The present invention provides, in one aspect, a method of making an air bag comprising joining pieces of fabric together by stitching in substantially straight lines so as to facilitate automated machine stitching of the pieces.

In another aspect the invention provides a method of making an air bag, the method comprising cutting pieces of fabric from a length of raw fabric, each piece of fabric being a polygon with a plurality of straight edges, and stitching together the pieces in substantially straight lines in such a way as to form a hollow cushion.

Accordingly the present invention may provide a method of making an air bag comprising sewing triangular pieces of air bag fabric to the long sides of a rectangular piece of air bag fabric, folding the result in half transversely and sewing abutting edges including the short edges of the rectangle and respective abutting edges of the triangles, subsequently displacing the apexes of the triangles so as to align the remaining unjoined sides of each triangle with the respective unjoined edges of the rectangle and stitching the resultant aligned edges together in substantially straight lines. Preferably the generally rectangular piece has each corner truncated.

The triangular pieces are sewn on one side of the long sides of the rectangle. Preferably they are right-angled triangles, which may have different length sides, though they may be obtuse angled triangles.

According to a preferred embodiment, two pairs of differently sized triangles are used with the larger ones sewn to opposite sides of one end of the rectangle, and the smaller ones sewn to opposite sides of the other end. The large and small triangles preferably have one side of the same length as each other, and the total sum of the lengths of the other four sides should equal the length of the long side of the rectangle.

According to a second aspect of the present invention there is also provided apparatus for making an air bag comprising means for attaching the long sides of triangular pieces of air bag fabric to end regions of the long sides of a rectangular piece of air bag fabric, means for folding the resultant shape, means for joining respective adjoining second sides of the triangles and joining the third sides of respective triangles to unjoined parts of the long sides of the rectangle.

A third aspect of the invention provides a cutting pattern for air bag fabric for use in the method of the first aspect, comprising a generally rectangular shape and four right-angled triangular shapes wherein two of the triangular shapes are substantially identical and are larger than the other two which are also substantially identical, the pairs of triangular shapes being arranged with their long sides adjacent each other and the other sides being respectively substantially parallel and perpendicular to a longitudinal edge of the fabric, and the rectangular piece being arranged with its long sides substantially parallel to the longitudinal edge of the fabric and all pieces being juxtaposed on the fabric with straight sides adjacent one another.

The invention also provides an air bag made according to any one of these methods or using the apparatus or the cutting pattern of the invention.

DETAILED DESCRIPTION OF DRAWINGS

Figure 1:
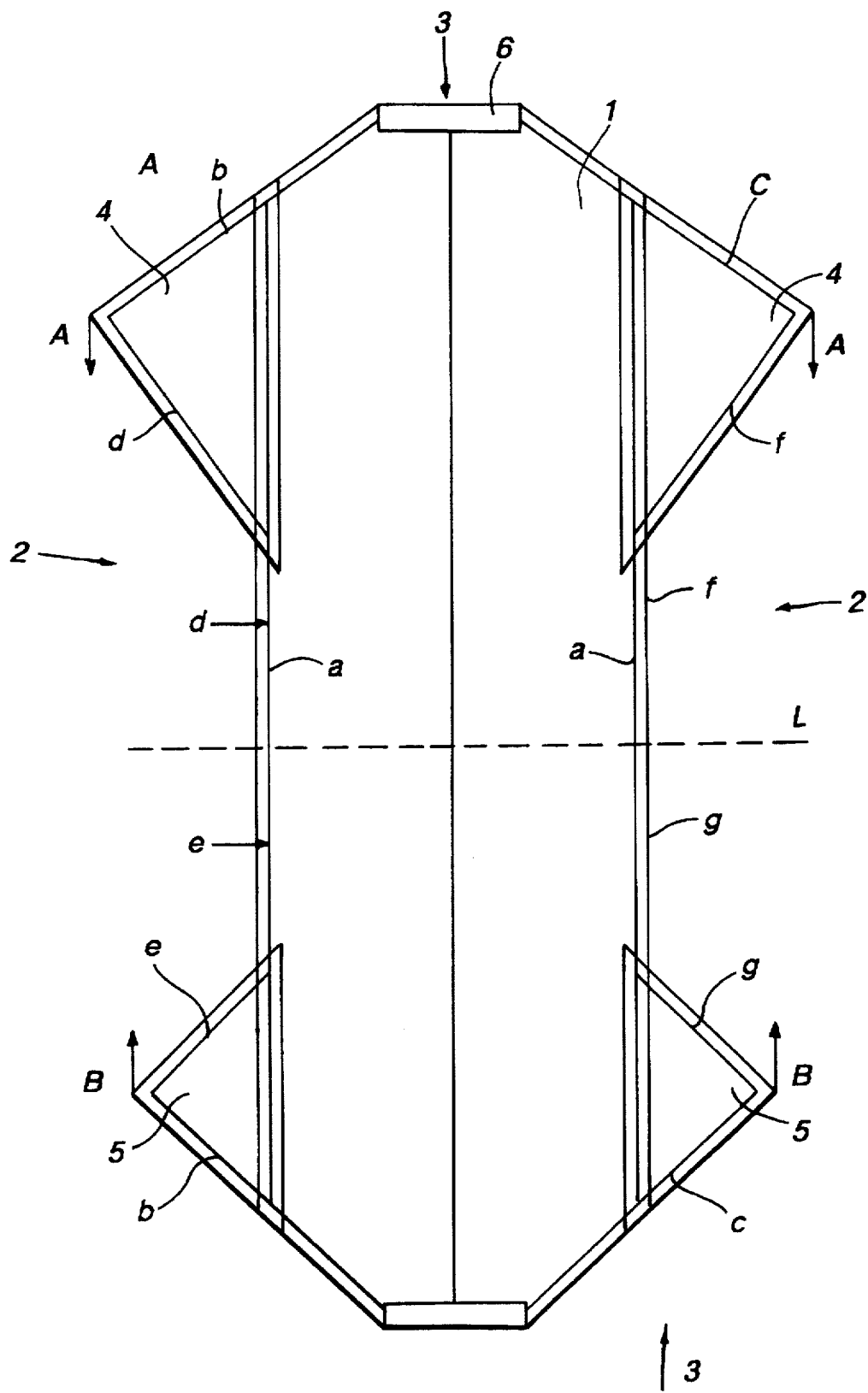
FIG. 1 shows pieces of an air bag partially sewn together according to the method of the invention.

FIG. 1 shows a generally rectangular piece 1 with two long sides 2 and two truncated tapering sides 3. Four triangular pieces 4 and 5 are attached to the long sides 2 at respective end regions thereof. These pieces 4 and 5 can be attached using an automated machine to sew two straight stitching lines along each of the long sides.

Subsequently the rectangular piece 1 with the triangles attached is folded in half along a transverse line of approximate symmetry L—L (this step can also be automated), and further stitching is effected to join sides b together and sides c together. Then the apexes of the joined pairs of triangles are pulled in the direction of arrows A and B (again automation is possible) to position the apexes to respective points L on the long sides 2 of the rectangular piece 1 and align the third side of each triangle with the respective open parts of the long sides of the rectangular piece 1. These sides are then stitched so that corresponding edges are joined: d to d, e to e, f to f and g to g. The result is a hollow fabric structure made with only straight seams with an opening defined by neck regions 6, for the introduction of inflation gas on operation of the device.

Since such an air bag design can be assembled substantially entirely using straight line stitching, it can be made by automated machines. This makes the constructions cheaper to produce then hand sewn designs.

Figure 2:
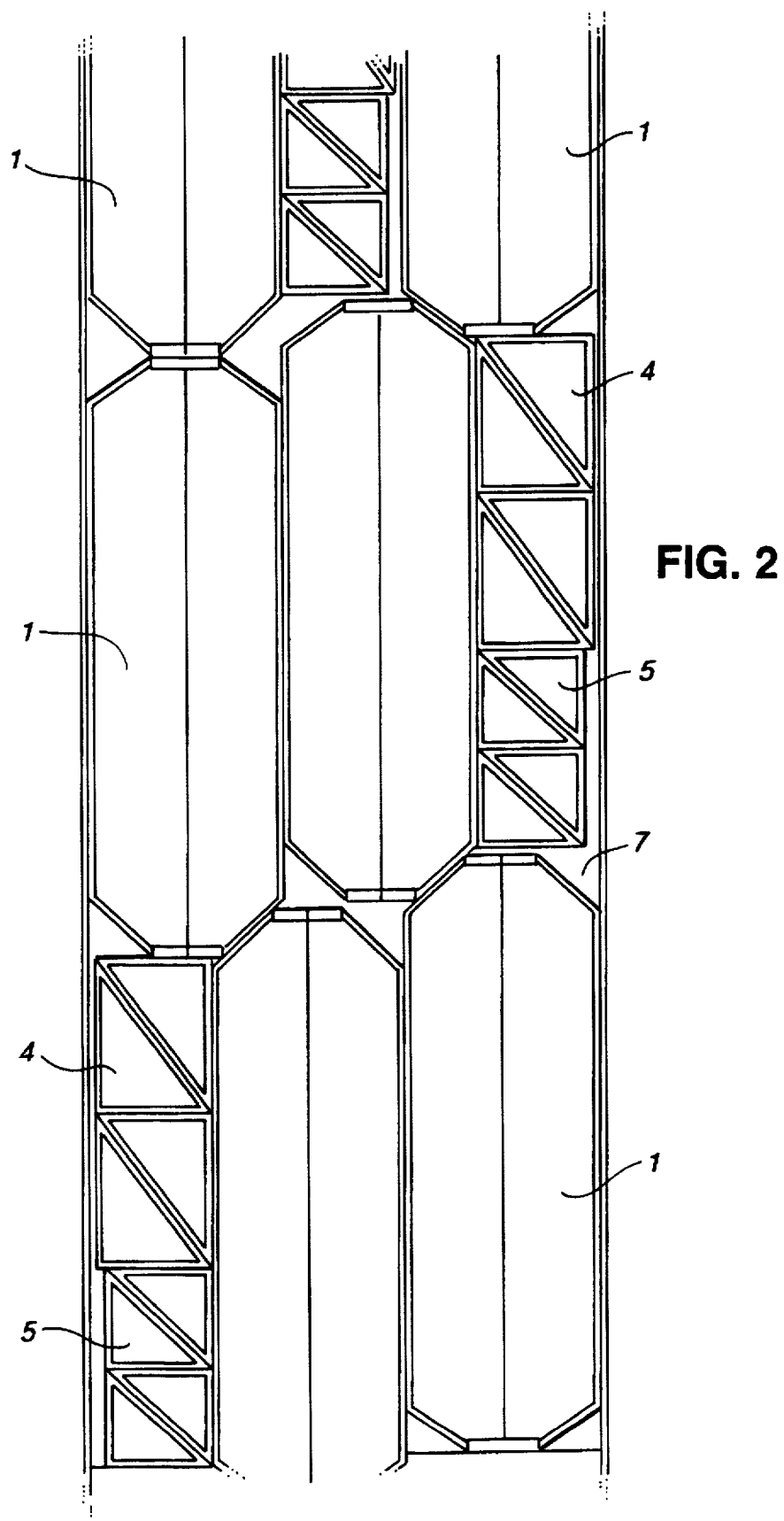
FIG. 2 shows one example of a pattern layout for pieces of air bags for use in the method of the invention.

Referring to FIG. 2, a suitable cutting pattern layout is shown with rectangular pieces 1 and triangular pieces 4 and 5 arranged for optimum use of raw material. It is thus seen to be more efficient to use straight-sided shaped pattern pieces such as triangles and rectangles, than curved edged pieces. The use of right-angled triangles allows pairs of triangles to fit together in square shapes so that sides of the cutting pattern pieces fall mostly either parallel or perpendicular to the long sides of the raw fabric, minimising wastage. The wasted area is shown as 7 and it has been calculated that up to 95% of the raw fabric material can be used productively in one example of a method according to this invention as compared to 86% maximum with prior art patterns.

Figure 3:
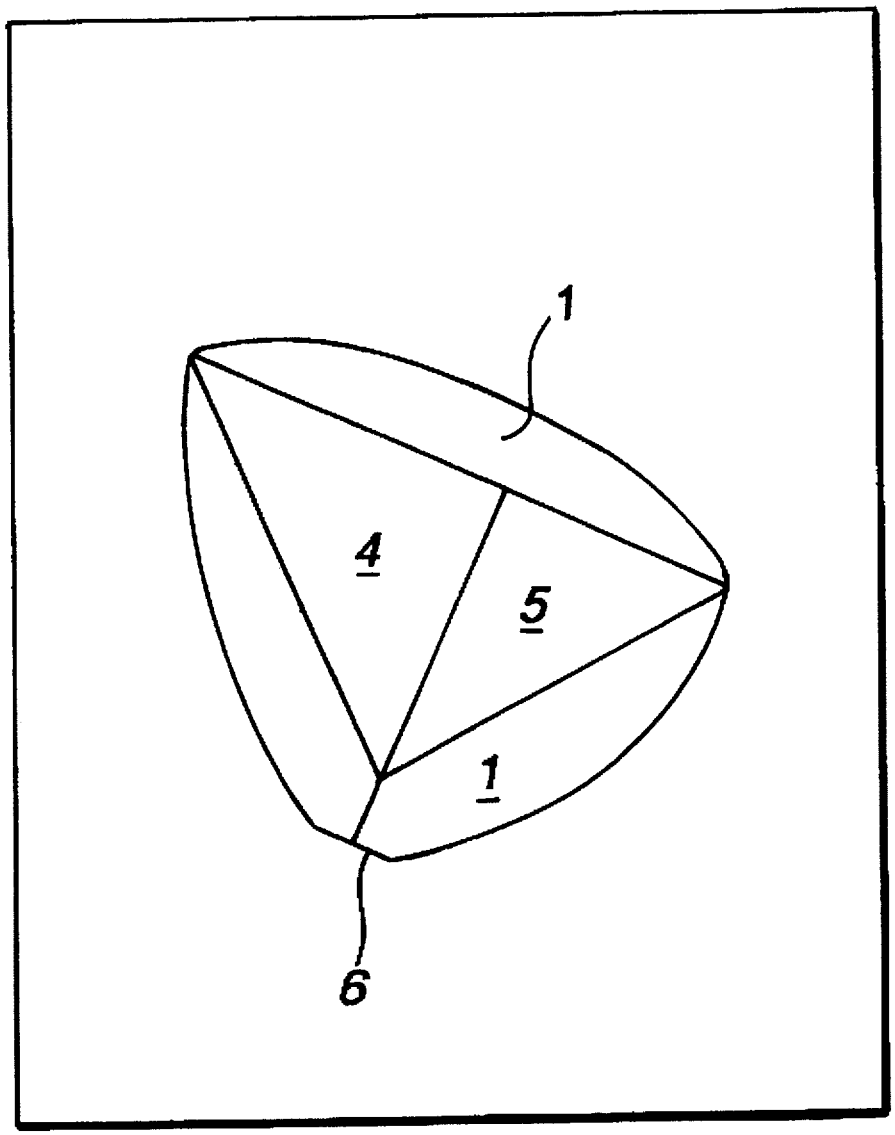
FIG. 3 shows an air bag made according to the method of the invention in an inflated state.

FIG. 3 illustrates an inflated air bag manufactured to the method of the invention, showing how the rectangular piece 1 had triangular pieces 4 and 5 fit together in the finish product.

The air bag made according to this method is strong: triangles are strong shapes and straight seams are more resilient to high inflation and impact pressures. A further advantage is that the air bag need not be turned inside out after stitching as in conventional methods.

What we claim is:

1. A method of making an air bag comprising the steps of cutting a generally rectangular piece of air bag fabric and cutting four triangular pieces of air bag fabric and sewing each of said triangular pieces to the long sides of said generally rectangular piece, folding the resulting structure generally in half transversely, sewing abutting edges including the short edges of the generally rectangular piece and respective abutting edges of the triangles, subsequently displacing the apexes of said triangles so as to align the remaining unjoined sides of each triangle with the respective unjoined edges of the rectangle and stitching the resultant aligned edges together in substantially straight lines.

2. A method according to claim 1, wherein said generally rectangular piece has each corner truncated.

3. A method according to claim 1, wherein each of said triangular pieces is an obtuse angled isosceles triangle, one side of which is sewn to a long side of the rectangle.

4. A method according to claim 1, wherein each of said triangles is an irregular triangle with three sides of different lengths.

5. A method according to claim 1, wherein each of said triangles is a right-angled triangle.

6. A method according to claim 3 comprising using pieces comprising two pairs of respectively differently sized triangles and wherein said larger triangles are sewn to opposite sides of one end of said generally rectangular piece and the small triangles are sewn to opposite sides of the other end of the rectangle.

7. A method according to claim 3, wherein each of said large triangles has one side which has the same length as one side of each of the small triangles.

8. A method according to claim 7, wherein the total sum of the length of the other two sides of one of the large triangles and the other two sides of one of the small triangles equals the length of one of the long sides of the rectangle.

9. A cutting pattern for making an air bag, from a length of air bag fabric which fabric has two parallel longitudinal edges, the pattern comprising a generally rectangular shape and four right-angled triangular shapes wherein two of said triangular shapes form a first pair and are substantially identical and are larger than the other two which are also substantially identical and which form a second pair, said pairs of triangular shapes being arranged with their long sides adjacent each other and the other sides being respectively substantially parallel and perpendicular to the longitudinal edges of the fabric, and a generally rectangular piece corresponding to said generally rectangular shape being arranged with its long sides substantially parallel to the longitudinal edge of the fabric and all pieces being juxtaposed on the fabric with straight sides adjacent one another.

10. A cutting pattern according to claim 9, wherein the rectangular shape is a rectangle which has each corner truncated.

11. A method according to claim 4, wherein each of said triangular pieces is an obtuse angled isosceles triangle, one side of which is sewn to a long side of the rectangle.

12. A method according to claim 4, wherein each of said triangles is an irregular triangle with three sides of different lengths.

13. A method according to claim 4, wherein each of said triangles is a right-angled triangle.

14. A method according to claim 4 comprising using pieces comprising two pairs of respectively differently sized triangles and wherein said larger triangles are sewn to opposite sides of one end of said generally rectangular piece and the small triangles are sewn to opposite sides of the other end of the rectangle.

15. A method according to claim 4, wherein each of said large triangles has one side which has the same length as one side of each of the small triangles.

16. A cutting pattern for making an air-bag from a length of air bag fabric which fabric has two parallel longitudinal edges spaced apart by a predetermined distance, the pattern comprising two generally rectangular shapes and eight right-angled triangular shapes wherein the two generally rectangulr shapes are arranged parallel to each other and to the long sides of the fabric and wherein the triangular shapes are arranged in pairs with their long sides adjacent each other to form generally square shapes, the other sides of each triangular shape being respectively substantially parallel and substantially perpendicular to the longitudinal edge of the fabric.

* * * * *